Nov. 27, 1962 W. A. FLUMERFELT 3,065,983
SELF-LOCKING THREADED CONNECTING MEMBER
Filed Dec. 21, 1959 2 Sheets-Sheet 1
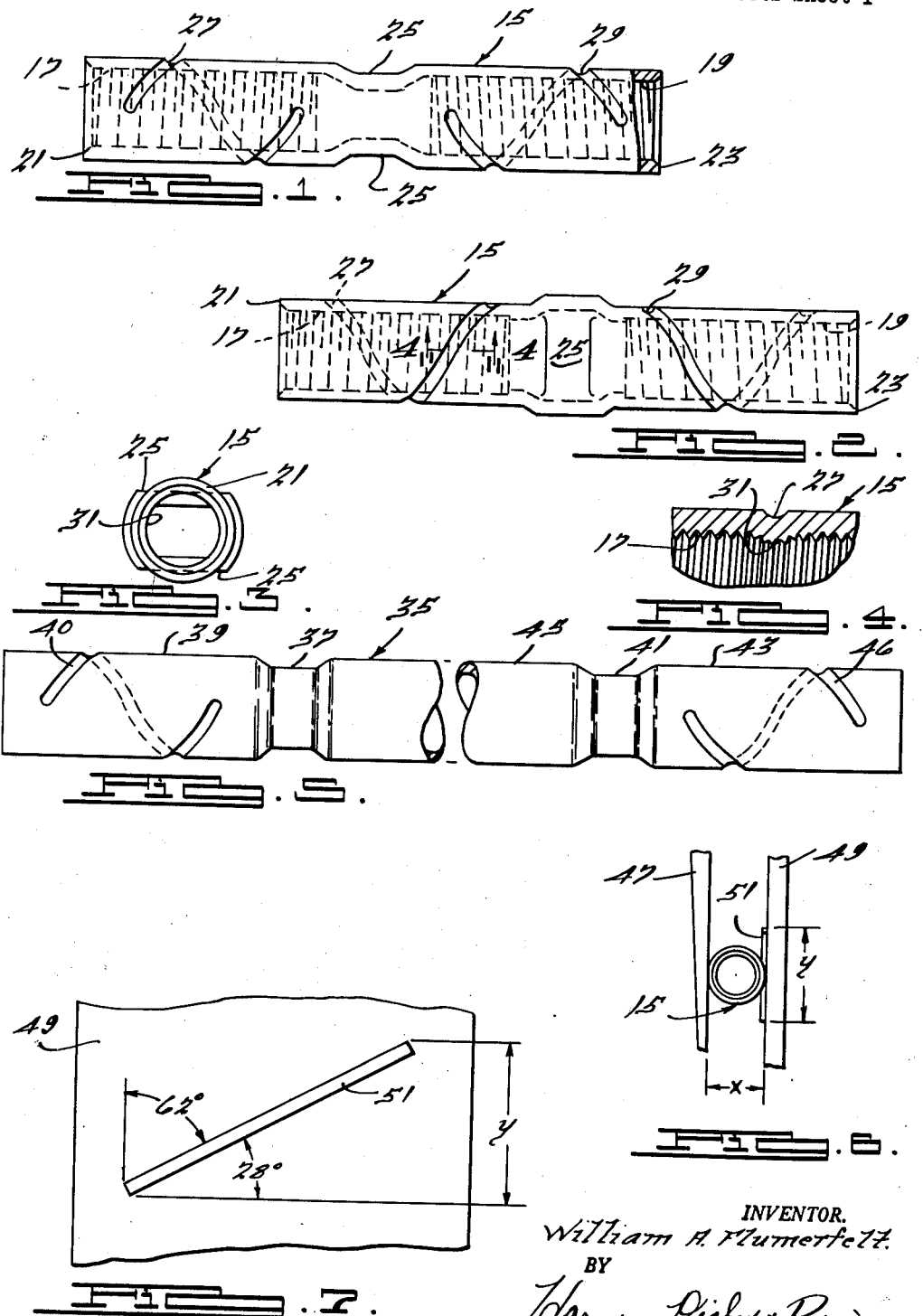
INVENTOR.
William A. Flumerfelt
BY
Harness, Dickey & Pierce
ATTORNEYS.

Nov. 27, 1962 W. A. FLUMERFELT 3,065,983
SELF-LOCKING THREADED CONNECTING MEMBER
Filed Dec. 21, 1959 2 Sheets-Sheet 2
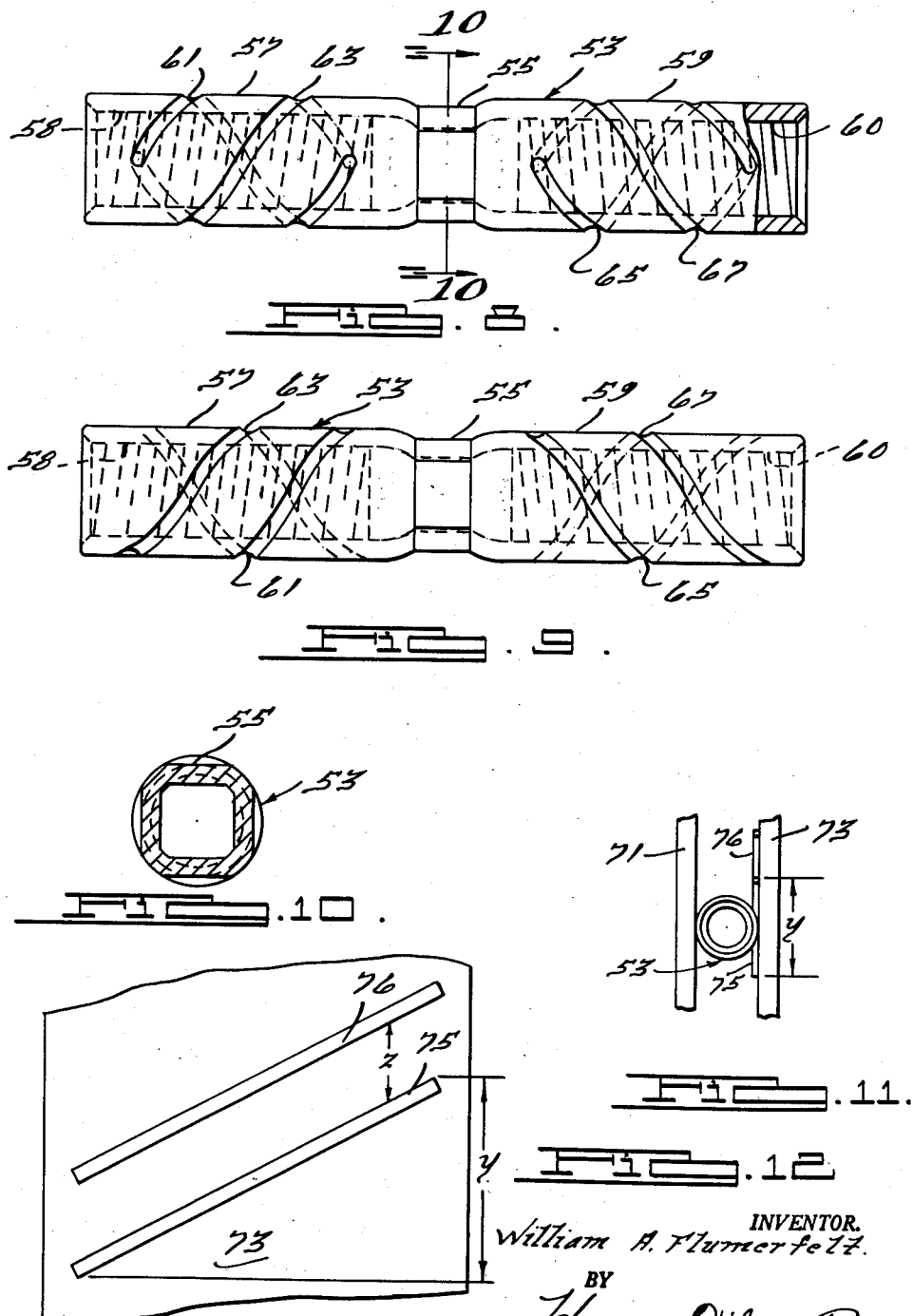
INVENTOR.
William A. Flumerfelt.
BY
Harness, Dickey + Pierce
ATTORNEYS.

United States Patent Office 3,065,983
Patented Nov. 27, 1962

3,065,983
SELF-LOCKING THREADED CONNECTING MEMBER
William A. Flumerfelt, Columbus, Ohio, assignor to Columbus Auto Parts Company, Columbus, Ohio, a corporation of Ohio
Filed Dec. 21, 1959, Ser. No. 860,860
9 Claims. (Cl. 287—60)

This invention relates to internally threaded connecting members, such as adjusting sleeves, tubular couplings, turnbuckles or the like and, particularly, to a self-locking connecting member.

It is an object of the present invention to provide a connecting member having a threaded bore in which the threads are controllably distorted to lockingly engage a stud threaded therein.

It is another object of the present invention to provide an adjusting sleeve for a vehicle steering linkage assembly or the like which will retain itself in an adjusted position without the use of clamp assemblies or other separate fastening devices.

It is another object of the present invention to provide an interiorly threaded tubular coupling having self-locking means effective to lockingly retain a threaded stud therein irrespective of whether the stud is screwed in a short distance or is fully threaded into the tube.

It is still another object of the present invention to provide an internally threaded tubular connecting member of the self-locking type in which the threads are distorted in a manner which permits the accurate control of the locking torque produced and whereby a uniform locking torque may be achieved or any desired variation in locking torque established.

It is still another object of the present invention to provide an internally threaded self-locking tubular member capable of a locking engagement of an extremely high torque value without seizure with the male threaded parts.

It is another object of the present invention to provide an internally threaded tubular member having distorted threads to produce a locking effect upon engagement with a threaded stud, wherein the likelihood of loss of the locking torque through localized reverse distortion of the tube or a "bell mouthed" distortion of the end of the tube is reduced or completely eliminated.

It is a still further object of the present invention to provide an adjusting sleeve having internal threads of opposite lead at the opposite ends thereof and exterior spiral grooves to distort a portion of said threads wherein the external grooves are readily visible to a workman and may be used as an indication of the hand or lead of the thread at each end of the sleeve.

It is still another object of the present invention to provide a self-locking adjusting sleeve which is dependable in operation, possesses a long, useful life, is sturdy in construction and may be inexpensively fabricated.

It is still another object of the present invention to provide a method of fabricating a self-locking tubular adjusting sleeve.

It is a further object of the present invention to provide an expeditious method for fabricating a self-locking adjusting sleeve which is reliable and which is effective to produce an adjusting sleeve of superior locking characteristics.

These and other objects of the present invention will become apparent from the following detailed description taken in conjunction with the accompanying drawings wherein:

FIGURE 1 is a plan view of an internally threaded connecting member embodying the principles of the present invention;

FIGS. 2 and 3 are front elevation and left-hand end views, respectively, of the structure shown in FIG. 1;

FIG. 4 is a sectional view of the structure shown in FIG. 1 taken along the line 4—4 thereof;

FIG. 5 is a view of structure similarly illustrated in FIG. 1 illustrating another form of the invention;

FIG. 6 is a diagrammatic view of structure which may be used in the fabrication of the connecting member illustrated in FIG. 1;

FIG. 7 is a plan view of one of the dies shown in FIG. 6;

FIG. 8 is a plan view of structure similarly illustrated in FIG. 1 showing still another form of the invention;

FIG. 9 is a front elevational view of the structure shown in FIG. 8;

FIG. 10 is a sectional view of the structure shown in FIG. 8, taken along the line 10—10 thereof;

FIG. 11 is a diagrammatic view of structure which may be used in the fabrication of the structure shown in FIGS. 8–10; and FIG. 12 is a plan view of one of the dies shown in FIG. 11.

Referring now to the drawings, the invention is illustrated in FIG. 1 in the form of an adjusting sleeve or turnbuckle, such as is used in vehicular steering assemblies for joining connecting rods to rod ends or socket assemblies. The sleeve consists of a tubular body 15 which may be conveniently made from butt-welded steel tubing. The tubular body 15 is provided with separate threads 17 and 19 adjacent its opposite ends 21 and 23, respectively. The threads 17 and 19 are desirably of opposite lead so that upon rotation of the tube in a given direction, the studs or other male threaded members which are threaded into the opposite ends thereof will either both advance inwardly into the tube or will both retract outwardly of the tube to either shorten or lengthen the assembly. While the sleeve may be rotated by any desirable means, such as by the use of a pipe wrench, the tube is preferably provided with a pair of opposite flats 25 in the middle thereof for the reception of an open-end wrench or the like. The sleeve is also provided with a pair of spiral or helical grooves 27 and 29 on the outer surface thereof which are disposed radially outwardly opposite the threads 17 and 19, respectively. The formation of the grooves 27 and 29 displaces the material of the wall of the tube body along the length thereof to inwardly distort the threads 17 and 19, as is shown at 31 in FIG. 4. The paths of thread distortion are, of course, of a helical or spiral shape, corresponding to the shape of the grooves 27 and 29.

The grooves 27 and 29 are desirably spaced inwardly from the first two or three revolutions of the threads 17 and 19 to permit easy starting of the male threaded member. However, as the male threaded member is threaded on into the sleeve, a binding engagement with the distorted portions of the sleeve thread will occur. The magnitude of the binding engagement between the male and female threads is measured by the number of pounds of torque required to produce relative rotation between the stud and the sleeve. Thus, self-locking prevailing torque fasteners are frequently rated by the torque required to overcome the locking or binding action produced by the thread distortion. It will be apparent that the torque rating of the sleeve illustrated herein will be in large part dependent upon the depth of the grooves 27 and 29.

As may be seen in FIGS. 1 and 2, the grooves 27 and 29 extend substantially 360 degrees around the tube and, thus, when a stud is fully threaded into the tube, the distorted threads will bear equally against all sides of the stud. Because of the length and shape of the grooves 27 and 29, the distorted threads will engage the male threaded part for almost the entire length thereof which is threaded into the sleeve. Furthermore, any spot or localized distortion of the tube developed during use or any tendency of the tube ends 21 and 23 to become bell mouthed will have little or no effect upon the locking torque produced.

The adjusting sleeve illustrated in FIGS. 1 through 4 is shown as being of a somewhat limited length and is particularly for use in connecting an elongated connecting rod to a socket assembly or rod end. It will be appreciated, however, that the adjustable connecting member of the present invention is not limited to any particular length but may be of an indeterminate length. Thus, there is illustrated in FIG. 5 an adjustable connecting member consisting of an elongated tubular body 35 provided with a wrench-receiving flat 37 adjacent the left-hand portion 39 thereof and which is formed with a spiral groove 40 on the outer periphery thereof. In addition, a wrench-receiving flat 41 is formed adjacent a right-hand end tube portion 43 having a spiral groove 46 formed on the outer surface thereof. A central portion 45 of the tube, which is unthreaded, may be of any desired length for connecting aligned male threaded members spaced any distance apart. Thus, it is entirely possible that in many present-day steering linkages, one tubular member may achieve the function which is presently performed by the connecting rod, the adjusting sleeve and the clamp assemblies used to secure the adjusting sleeve in position.

FIGS. 6 and 7 diagrammatically illustrate suitable mechanism by which the spiral grooves may be formed in the connecting member of the present invention. The tubular body 15 is shown positioned between a pair of dies 47 and 49 which are provided with spaced parallel flat faces and which are adapted to be relatively moved in a vertical direction. The die 49 is provided with a raised ridge 51 extending diagonally across the face thereof. The two dies are spaced apart a distance "X" which is equal to slightly less than the diameter of the body 15. Thus, the body 15 is forced under pressure against the face of the die 49 and, upon relative movement of the dies, the ridge 51 is forced into the outer surface of the tubular body 15 to form the groove. The height of the ridge 51, of course, determines the depth of the groove formed and this dimension may be empirically established to produce the magnitude of the torque desired. While the ridge 51 may be arranged in a variety of angles to the direction of relative die movement, an angle of 62 degrees has been found to produce good results. This angle will produce a groove helix angle of 28 degrees (i.e. 90 degrees minus 62 degrees). The length of the ridge 51 measured in the direction of relative die movement is indicated by the letter "Y" in the drawings. This dimension is preferably equal to the circumference of the tubular body 15, thus resulting in a groove extending 360 degrees around the tubular body 15. The grooves 27 and 29 may either be formed one at a time or a die may be made with a pair of ridges for forming the grooves 27 and 29 simultaneously. In any event, the mechanism of FIGS. 6 and 7 is quite simple in nature and lends itself to inexpensive, high production techniques.

Another form of the invention is illustrated in FIGS. 8 to 10 wherein a tubular body 53 is shown as being provided with a central wrench-receiving portion 55 of square cross section. A left-hand end portion of the body 53 is provided with an internal thread 58, which the right-hand end portion 59 of the body 53 is formed with a thread 60, preferably of opposite hand to the thread 59 for the reasons previously mentioned. The thread 58 is distorted in a pair of helical paths produced by the formation of a pair of spaced grooves 61 and 63 on the outer surface thereof. The grooves 61 and 63 are spaced 180 degrees apart throughout their length and, of course, are of the same helix angle. Thus, for any position along the length of the thread 58 (within the limits of the grooves 61 and 63) thread deformation will exist at diametrically opposite locations on the thread. The right-hand end portion 59 of the tubular body 53 is also provided with a pair of 180 degrees spaced helical grooves 65 and 67, which result in diametrically opposite deformations of the thread 60 at any location along the length thereof within the length of the grooves 65 and 67. It has been found that the provision of just one spiral groove of a uniform depth in a given thread produces a locking action in which the resulting torque increases the further the male threaded part is screwed into the sleeve thread. This result is believed to result from the crowding of the male threaded member or stud against a side of the sleeve opposite to the location of the deformation at the initial portion thereof. The formation of diametrically opposite distortions has been found to maintain the stud or male threaded part generally centered within the tube, resulting in a constant torque, irrespective of the depth to which the male threaded part is screwed into the sleeve.

FIGS. 11 and 12 illustrate suitable mechanism for the formation of the grooves 61 and 63 or 65 and 67, which include a pair of dies 71 and 73 between which the tubular body member 53 is positioned. As in the structure illustrated in FIGS. 6 and 7, the dies 71 and 73 are intended to be relatively moved in a vertical direction. Upon such movement, the die 71 forces the tubular body 53 against the face of the die 73 to cause a pair of spaced ridges 75 and 76 formed on the die 73 to form the desired grooves and distort the threads 58 and 60 by inward displacement of the wall of the body 53 in a helical path. The ridges 75 and 76 are spaced apart in the direction of relative die movement by a distance "Z" which is equal to one-half the circumference of the tubular body 53 to produce 180 degree spacing of the grooves. Each of the ridges 75 and 76 extends a distance "Y" in the direction of relative die movement, which is equal to the circumference of the tubular body 53. Thus, each of the grooves extends 360 degrees around the body 53.

It will be appreciated that by varying the height of the ridge 51 of the die structure shown in FIGS. 6 and 7, or the height of the ridges 75 and 76 of the die structure shown in FIGS. 11 and 12, the magnitude of locking torque encountered at various thread depths may be accurately controlled. It has been found that the locking torque obtainable with the structure of the present invention may be made relatively high without resulting in seizure between the male threaded part and the sleeve. Furthermore, the structure of the present invention results in a relatively low percentage of loss of locking torque resulting from repeated in and out threadings of the male threaded part. Also, any distortion of the sleeve through substantial lateral forces or vibrations between the male threaded part and the sleeve which tends to distort the sleeve to a generally elliptical cross section will have little, if any, effect upon the locking torque of the sleeve, due to the spiral shape of the thread deformation.

While it will be apparent that the preferred embodiments herein illustrated are well calculated to fulfill the objects above stated, it will be appreciated that the invention is susceptible to modification, variation and change without departing from the proper scope or fair meaning of the subjoined claims.

What is claimed is:

1. A connecting member having a tubular portion provided with an internal thread adjacent one end thereof, the material forming the wall of said tubular portion being inwardly displaced in a generally spiral path to form a generally spiral distortion in said thread.

2. A connecting member having an internally threaded tubular portion, the material of said tubular portion adjacent said threads being inwardly displaced in an elongated spiral path extending substantially 360 degrees around said tubular portion to distort the thread opposite said path.

3. An elongated tubular member having internal threads of opposite pitch formed in the opposite ends thereof, and said tubular member having a pair of helical grooves formed in the exterior surface thereof, one adjacent each end thereof, said threads being inwardly distorted in paths adjacent said grooves.

4. A connecting member having a tubular portion provided with an internal thread, said thread being radially inwardly distorted in two helical paths disposed substantially 180 degrees apart.

5. A tubular adjusting sleeve comprising a metallic tube having internal threads of opposite pitch at the opposite ends thereof, a pair of grooves formed on the outer surface of said tube at each end thereof, said grooves being disposed on a substantially helical path and being substantially 180 degrees apart, that portion of the thread adjacent said grooves being inwardly distorted along paths opposite said grooves.

6. The method of fabricating a self-locking adjusting sleeve which includes internally threading a tubular member and inwardly displacing a portion of the material of the tubular wall adjacent said thread in a generally spiral path to distort said thread in a generally spiral path.

7. The method of making a self-locking connecting member which includes internally threading a tubular element and rolling said tubular element under pressure against a die having a raised, elongated ridge formed thereon to form a substantially spiral groove in the outer surface of said tubular element and to distort said threads inwardly in a generally spiral path.

8. The method of fabricating a self-locking adjusting sleeve which includes forming an internal thread in a tubular member adjacent one end thereof, placing said tubular member between a pair of dies, one of said dies having a raised, rectilinear ridge formed thereon, and relatively moving said dies in a direction inclined to said ridge to roll said tube over said one die to force said ridge into the wall of said tube and form an external groove in said tube, thereby inwardly distorting said thread in a generally spiral path.

9. The method of fabricating a self-locking adjusting sleeve which includes forming an internal thread in one end of a tubular member and rolling said one end under pressure against a die having a pair of spaced, raised ridges thereon and in a direction to form a pair of oppositely located spiral grooves in said tube, said ridges being spaced apart in the direction of relative movement of said dies an amount equal to substantially one-half the circumference of said tube, whereby said groove and said thread distortion paths will be substantially 180 degrees apart.

References Cited in the file of this patent

UNITED STATES PATENTS

| Re. 24,753 | Rohe | Dec. 15, 1959 |
| 339,534 | Dickson | Apr. 6, 1886 |
| 935,659 | Johnson | Oct. 5, 1909 |
| 1,176,904 | Jones | Mar. 28, 1916 |
| 1,317,605 | Thompson | Sept. 30, 1919 |
| 1,497,398 | Axelson et al. | June 10, 1924 |
| 2,596,885 | Booth | May 13, 1953 |

FOREIGN PATENTS

| 525,423 | France | June 4, 1921 |